United States Patent

Mayr et al.

Patent Number: 5,934,831
Date of Patent: Aug. 10, 1999

[54] METHOD AND DEVICE FOR PRODUCING A CABLE

[75] Inventors: Ernst Mayr, Starnberg; Ernst Opel, Roedental; Waldemar Stocklein, Coburg; Guenther Uhlenhuth, Roedental; Lothar Finzel, Unterschleissheim, all of Germany

[73] Assignee: Siemens Aktiengesellschaft, Munich, Germany

[21] Appl. No.: 08/786,761

[22] Filed: Jan. 24, 1997

[30] Foreign Application Priority Data

Jan. 24, 1996 [DE] Germany ........................... 196 02 432

[51] Int. Cl.⁶ ..................................... F16L 1/00
[52] U.S. Cl. .................. 405/155; 138/114; 138/149; 405/154; 405/174
[58] Field of Search ................... 405/155, 156, 405/174–183; 228/148; 29/450, 430, 458; 138/110, 114, 149

[56] References Cited

U.S. PATENT DOCUMENTS

| | | | |
|---|---|---|---|
| 2,605,202 | 7/1952 | Reynolds | 405/157 X |
| 3,132,416 | 5/1964 | Hait | 405/157 X |
| 3,193,432 | 7/1965 | Baines | 405/156 X |
| 3,250,077 | 5/1966 | Ede | 405/156 |
| 3,251,332 | 5/1966 | Vassar | 405/156 X |
| 3,380,258 | 4/1968 | Young | 405/156 |
| 3,456,449 | 7/1969 | Heil | 405/156 |
| 3,473,339 | 10/1969 | Schlafly | 405/157 |
| 3,563,825 | 2/1971 | Segura et al. | 405/157 X |
| 3,959,977 | 6/1976 | Godbersen | 405/155 |
| 4,110,991 | 9/1978 | Torkuhl | 405/155 X |
| 4,437,789 | 3/1984 | Kasiewicz | 405/155 X |
| 4,448,567 | 5/1984 | Tsuda | 405/156 X |
| 4,514,035 | 4/1985 | Steinmann et al. | |
| 4,896,997 | 1/1990 | Gaylin | 405/156 |
| 5,121,872 | 6/1992 | Legget | |
| 5,127,630 | 7/1992 | Oestreich | |
| 5,145,282 | 9/1992 | Payne | 405/155 |

FOREIGN PATENT DOCUMENTS

| | | | |
|---|---|---|---|
| 22413 | 10/1959 | Australia | 405/155 |
| 431207 | 2/1948 | Italy | 405/155 |

*Primary Examiner*—Dennis L. Taylor
*Attorney, Agent, or Firm*—Hill & Simpson

[57] ABSTRACT

A method and device for on-site producing a cable at the location for placing the cable includes a mobile device supporting an arrangement for forming a protective sheath of the cable and an arrangement for inserting the optical fibers or electrical leads into the sheath and then discharging the sheath into a cable laying position. The device may include an arrangement for forming a trench for receiving the cable, an arrangement for inserting a filling compound into the interior of the sheath as the leads or fibers are introduced therein and means for supplying a filling material for filling the trench subsequent to insertion of the cable therein.

10 Claims, 3 Drawing Sheets

METHOD AND DEVICE FOR PRODUCING A CABLE

BACKGROUND OF THE INVENTION

The present invention is directed to a method and device for producing a cable having at least one outer protective sheath and at least one electrical and/or optical fiber arranged in the interior of the sheath.

U.S. Pat. No. 5,127,630, whose disclosure is incorporated herein by reference thereto and which claims priority from the same German Application as European Published Application 0 384 201, discloses that it is old to subsequently insert an optical fiber into a pipe which has been previously installed in the ground or into cable ducts by means of a compressed air or blowing arrangement. This method presupposes that the respective pipe or cable duct has already been appropriately laid at some time before the performance of the method of inserting the additional optical fiber.

In the case of marine or submarine cables, it is known for the cable-laying ship to add or to provide an additional further protective sleeve containing tensile elements on the outside of a complete optical cable. This method presupposes the presence of a complete optical cable, which is subsequently provided only additionally with armoring elements.

The major proportion of the material used in the cable, and many of the operations necessary for their production, essentially only serve the purpose of protecting the product to a sufficient extent during transporting within the factory and from the factory to the construction site and/or to impart to the cable a capability of being moved, bent, pressed, pulled and laid. Furthermore, in the production area, it is necessary to take measures to protect the product to a sufficient extent from environmental influences during the long processing, transporting and laying times. The actual cable production takes place in buildings which have been set up specifically for this purpose, and the storage of the intermediate products must generally be carried out under a roof and within an enclosure which has a controlled climate. During the many transport journeys until the final laying of the cable, damage can be caused, which damage has to be repaired in a costly manner. In addition, during the transport, large quantities of material are to be moved, which materials are only actually partially needed or in specific part areas and, therefore, in fact, are not needed at all. Before the transport to the customer, the functional serviceability of the respective cable must be documented by means of appropriate tests. These known methods of cable production, thus, necessitate great expenditures on method steps and on test operations and, in addition, require employment of a relatively large quantity of material.

SUMMARY OF THE INVENTION

The object of the present invention is based on providing a method which makes it easy to handle and which reduces the material expenditures and/or transport expenditures as far as possible. This object is achieved in the case of the method of the type mentioned in the beginning in that a mobile device is provided and the mobile device is provided with a supply coil of a lead, which may be either an electrical wire or an optical fiber, and, furthermore, the mobile device provides a protective sheath in which the lead is introduced into the sheath and in that, following the insertion of the lead into the protective sheath, the cable thus produced is brought out of the mobile device into a laying position.

In contrast to the known production methods in which the cable is produced in specific production rooms, in the case of the method according to the present invention, the production is, therefore, virtually possible "on site", that is to say that the cable production is carried out directly in conjunction with the actual laying process for the cable. This has the advantage that precisely those cables which are needed respectively at the respective site are produced, and that prefabrication with corresponding stock holding, supervision, testing and costly transportation can be avoided.

The invention also relates, moreover, to a device for producing a cable having at least one outer protective sheath and at least one lead, which may be an electrical lead or an optical fiber, arranged in the interior of the sheath, which device is characterized in that the device is of a mobile design and has at least one supply coil for the lead and in that, moreover, means for providing a protective sheath are provided on the mobile device and in that, in the region of the mobile device, means are provided which permit the leads to be introduced into the protective sheath.

Other advantages and features of the invention will be readily apparent from the following description of the preferred embodiments, the drawings and claims.

DESCRIPTION OF THE PREFERRED EMBODIMENTS

The principles of the present invention are particularly useful when incorporated in a structure AB1 on a mobile device or vehicle, generally indicated at VC1. The vehicle VC1 is provided with a drive motor MO and is expediently constructed in the manner of a heavy goods vehicle or road construction machine. The vehicle VC1 is advantageously designed as an off-road vehicle and, instead of wheels, it may be provided with caterpillar tracks or a combination of caterpillar tracks and wheels for locomotion. It is also possible that the device or vehicle VC1 be provided with an air cushion, either alone or in combination with caterpillar tracks or wheels, to enable passage over swampy areas. It is also possible, for example, to accommodate the individual elements in an articulated semi-trailer, so that the front part of the heavy goods vehicle represented here would correspond to the tractor, whereas the structure AB1 would be assigned to a semi-trailer. In addition, it is also possible to accommodate the structure AB1, for example, in a trailer which is then moved by a tractor. The mobile device VC1 represents a movable cable production apparatus and serves for the on-site production of a cable CA1 for immediate laying.

Figure 5:
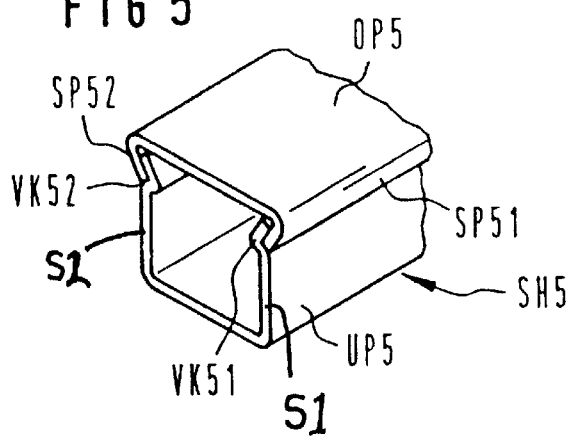
FIG. 5 is a perspective view of an end of a protective sheath having a U-shaped profile and a covering cap.
Figure 6:
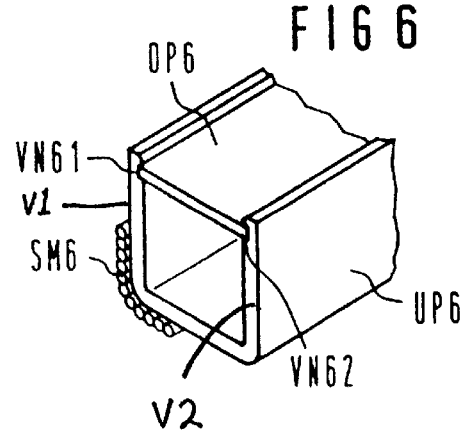
FIG. 6 is a perspective view of an end of a protective sheath having a U-shaped protective sheath profile receiving a closure device in a latching manner.

The structure AB1, in detail, contains one or more frames FR1, which serve to accommodate supply coils. In the present example, for reasons of simplicity, only a single frame is represented and all the supply coils are mounted thereon. One supply coil SU1 is needed for a sheath corresponding to the cable outer covering, which preferably consists of a plastic material. It can also be a preformed steel sheath similar to a plastic book ring-binder, which has been pre-shaped in such a way that it will form a tube as soon as it is drawn off to a relaxed state from the supply coil on which it has been wound up flat and, hence, forms a tube around the leads, which may be wires or fibers, and which tube, subsequently, for example, can be welded shut to form a water-tight cable. In the present example, it is assumed that the sheath SH1 for the cable CA1 to be produced is of a two-part design and comprises an approximately U-shaped lower part UP1, which is drawn off from the supply coil SU1. In addition, an upper part OP1 is provided, which closes the open side of the U-shaped lower part UP1, such as illustrated in FIGS. 5 and 6. This upper part OP1 needs to be designed generally only in the form of a closure strip or closure tape. However, it is also possible to form the sheath SH1 for the finished cable CA1 from two half-shells. In this case, one of the shell-halves would, in each case, have to be accommodated on the supply coils SU1 and SO1. Finally, it is also possible, for example, to wind a slit or closed tube, preferably made of plastic or, if appropriate, also of metal, on the drum or coil SU1 and before the insertion of the corresponding conductor elements to open said tube continuously using a spreading or cutting device, for example in the form of a wedge or knife or the like. Subsequent to laying in the conductor elements, this sheath would be closed off to form a tight sheath, once more in a suitable manner, for example, by bonding, welding or covering with a closure tape, etc.

The individual conductor elements are provided on supply coils SL1–SLn, which coils correspond to the supply coils normally used in a cable production. The drawing-off is carried out either overhead, as shown, or by unwinding from rotatable supply coils SL1–SLn. The conductor elements LD1–LDn in the form of electrical wires and/or optical fibers, such as, for example, single optical fibers only provided with a coating, optical hollow wires or solid wires, optical fiber ribbons or bundles and electrical wires, electrical wire bundles, such as quads or the like, are provided on the supply coils SL1–SLn and are drawn off from the supply coils SL1–SLn and are then guided to the sheath UP1 via appropriate guide devices, which are not shown in detail.

Figure 2:
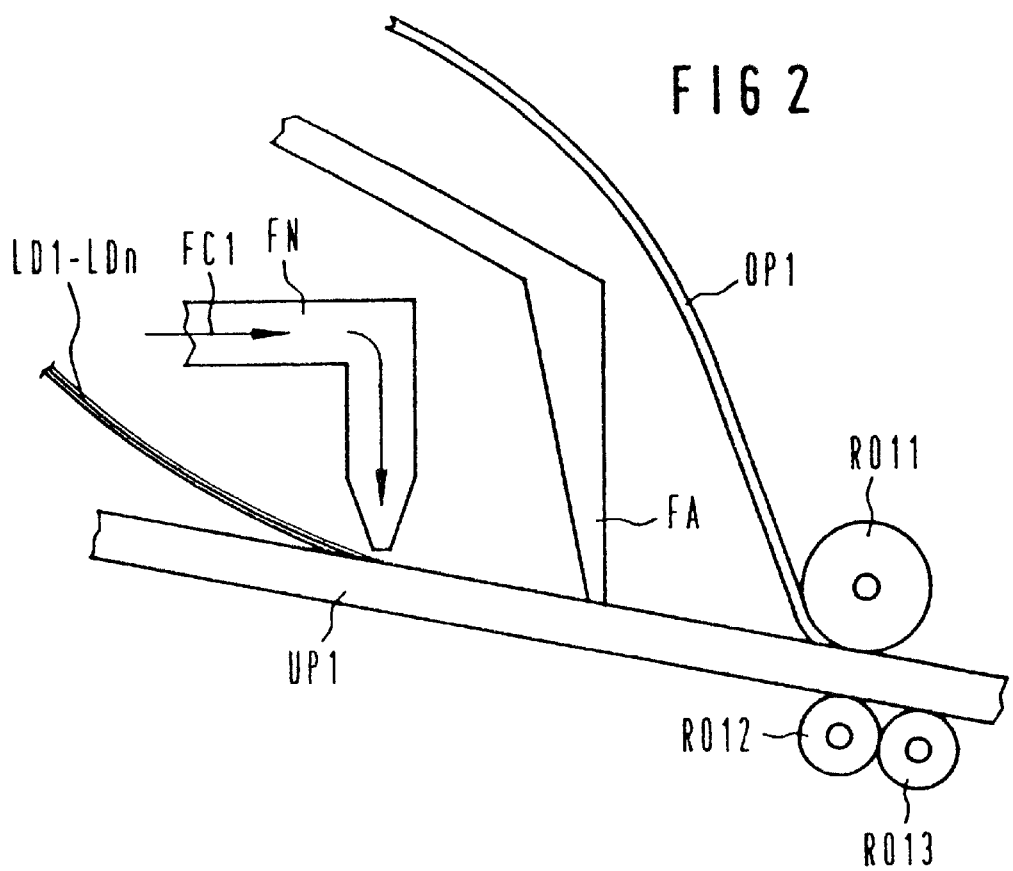
FIG. 2 is an enlarged side view schematically illustrating the arrangement for combining the various elements to form the finished cable.

If the finished cable CA1 is intended to be filled, an appropriate filling device FT1 is then provided, in which a filling compound FC1, which is made, for example, from oil and/or a thickening agent or a thixotropic agent, is introduced into the interior of the lower sheath UP1, as can be seen in more detail from FIG. 2. When a U-shaped lower part having an open upper side is used, a tape-like upper part OP1 is drawn off from an additional supply coil SO1 and is pressed into the lower part via corresponding pressure devices, which are illustrated as being an upper roller RO11 acting on the cover OP1 and two mating rollers RO12 and RO13, which support the lower part, and, for example, the cover is held in a latching manner. However, it is also advantageously possible to use other possible connections, such as, for example, welding, bonding or the like. The finished cable CA1 thus obtained is moved over corresponding guide devices, for example guide tubes or guide rollers (not shown), in the direction of the rear end of the vehicle VC1 and is then laid into a slot or cable trench GS made below the surface GR of the ground.

In order to produce the slot or trench GS, a corresponding device PL1 is expediently provided for the vehicle VC1. In the present case, the device is designed as a plough. The depth of the plough shear determines the inlaying depth of the finished cable CA1 into the cable trench or cable slot GS. The slotting or separating device PL1 is expediently firmly connected to the vehicle VC1, but advantageously mounted by means which enable the device PL1 to be lifted and/or lowered, as indicated by the arrow AP1. The separating or slotting device PL1 can also be designed in the form of a rotating digging wheel or milling cutter or in other suitable ways. It is only necessary for the width and the depth to be selected so that the dimensions of the desired cable trench or slot GS are obtained.

For laying the cable in open country, it is advantageous if the device PL1, serving to produce the cable trench GS, is arranged between the two outer wheels of the vehicle, preferably approximately centrally. In this way, the cable CA1 can emerge continuously approximately from the center of the vehicle VC1 and can be introduced into the cable trench GS. In other cases, for example in the case of laying cables on pavement, it may be expedient for the vehicle VC1 to be constructed so that the emergence of the cable CA1 takes place eccentrically, preferably displaced to one of the sides or, if appropriate, even completely at the side of the vehicle. For this purpose, appropriate deflecting devices are to be provided so that the cable CA1 can leave the vehicle VC1 not from the rear, but approximately in the region of a side wall. In this case, the device PL1 serving for the production of the cable trench GS is also to be arranged outside the vehicle VC1, for example is able to be moved out appropriately by means of a slide or guide, so that it can be brought into the desired operating position on one side of the vehicle VC1. The device for producing a cable trench can also be designed as an independent vehicle and be sent out in advance of the laying vehicle, for example in the case of laying the cable under pavement.

If the cable trench GS is very narrow, it may be expedient to provide the vehicle VC1 with a supply container GF1 for a filling material for the slot GS. This filling material, for example, may be sand or other fine-ground materials and is accommodated in an appropriate supply container, whose connecting nozzle GFA1 expediently reaches as far as the slot GS on the ground GR.

If necessary, additional armoring parts can be applied to the cable GA1, for example in the form of a roving of metal fabric, a continuous corrugated steel pipe cover or other support and/or protective sheaths. Corresponding supply coils (not shown) are then also provided in the vehicle for this material.

Figure 1:
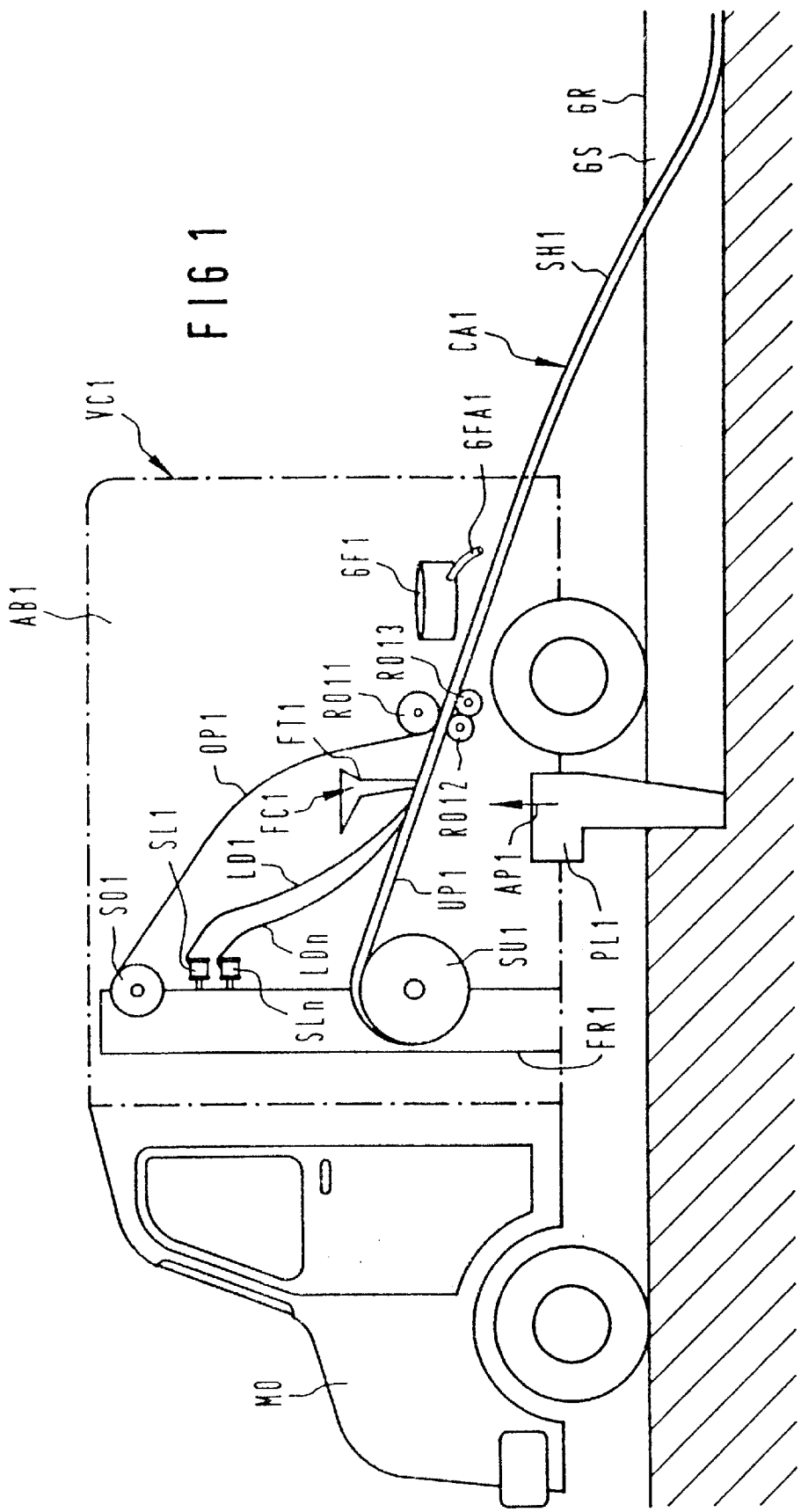
FIG. 1 is a schematic side view of a vehicle suitable for cable production in accordance with the present invention.
Figure 3:
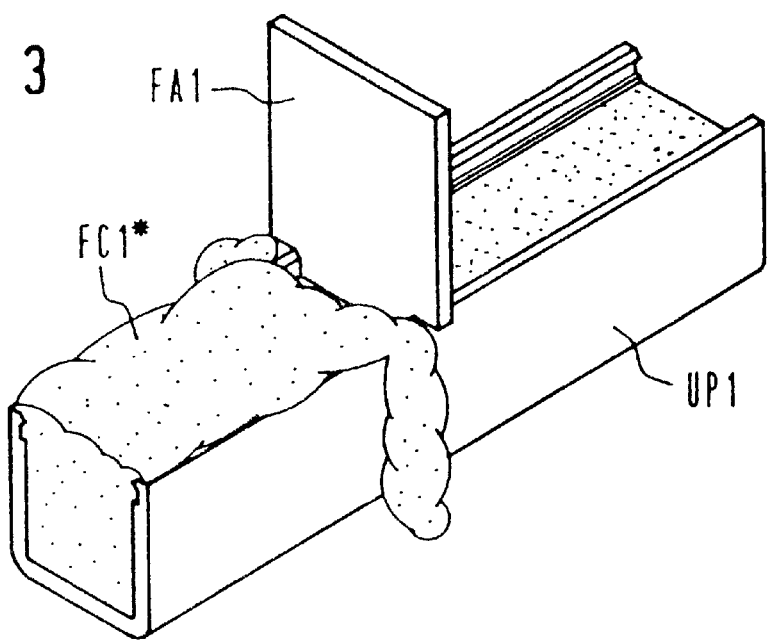
FIG. 3 is a perspective view illustrating the step of wiping off excess filling compound from the sheath.

In FIG. 2, a U-shaped profile UP1 is shown in a side view, and the individual conductors or wires LD1–LDn have already been combined into a bundle. Via a filling nozzle or needle FN, the filling compound FC1, together with the conductors LD1–LDn, are pressed into the interior of the U-shaped profile UP1. Since, in general, more filling compound FC1 is fed than is required for closing the cross section of the U-shaped profile, it is advantageous to provide, after the filling needle FN, a wiping-off means FA, which, as best illustrated in FIG. 3, includes a wiping plate FA1, which stands transversely to the axis of the profile UP1 and wipes off an excess part FC1* of the filling compound from the profile. This excess amount may be caught in a container (not illustrated) and returned to the supply container FT1 for the filling compound FC1 of FIG. 1.

Figure 4:
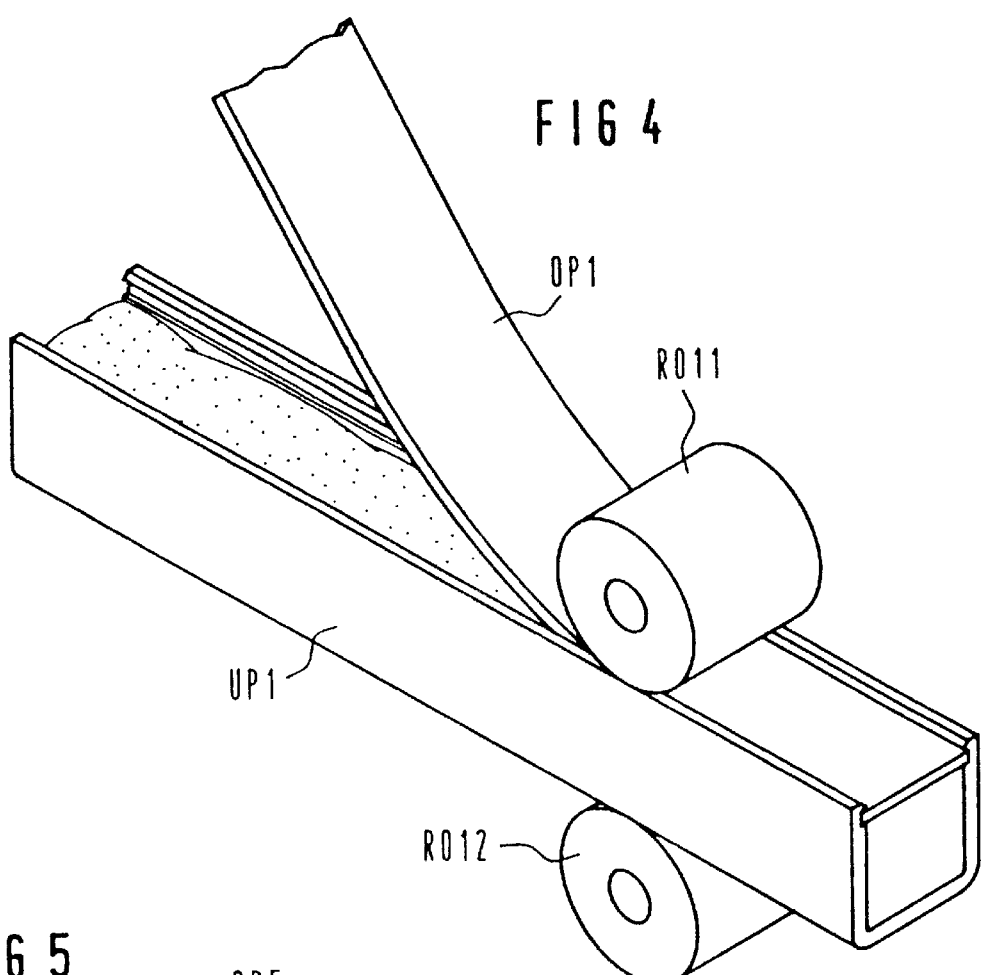
FIG. 4 is a perspective view illustrating the closure of an open profile by means of a pressure roller.

In accordance with FIGS. 2 and 4, the closure tape or the closure strip or another closure device OP1 is applied by means of the pressure roller RO11 to the U-shaped profile UP1, which was filled uniformly in this way with the conductors LD1–LDn and the filling compound FC1. In order to produce a counter-pressure and support the profile UP1, at least one mating roller, for example RO12, is provided.

An exemplary embodiment for the configuration of a protective sleeve made of two parts UP5 and OP5 is illustrated in FIG. 5. The lower part UP5, in which the filling compound and the conductors have been left out in order to simplify the representation, has a U shape with side limbs S1 and S2. Each side limb S1 and S2, at a top, has a groove or notch-shaped depression VK51 and VK52, respectively, which lie opposite each other in mirror-image fashion and are arranged at a slight distance from the end of the upper edge of the side limbs S1 and S2. Provided on the upper part OP5, serving as a cover or lid, are two inwardly drawn limbs SP51 and SP52, which are configured in such a way that they engage into the depressions or notches VK51 and VK52 and are held there, preferably in a latching manner. In this way, a tight, firm and stable construction of the protective sheath SH5 is obtained for the cable which is being produced.

Another embodiment of the U-shaped profile UP6 is illustrated in FIG. 6 and has side limbs V1 and V2. An inside region of an upper end of the side limbs V1 and V2 has two longitudinal grooves VN61 and VN62, into which the upper part OP6, designed as a flat tape, can be pressed and is held there in a latching manner. If necessary, for the purpose of holding it together and/or for protection, additional armoring or wrapping SM6, which is only represented in a sub-region, is provided and can be applied on the outside. The armoring of this type may be necessary when protection against rodents is necessary, for example the design of the armoring SM6 is in the form of a weave.

Instead of mechanically appropriately preparing the closure elements, for example in the form of elements UP1 and OP1, the procedure can also be such that an extruder is mounted in the drivable mobile unit VC1. The conductor elements LD1–LDn are then running into an injection head of the extruder in a known way, and this extruder then produces, at its outlet, a protective sheath SH1, which is preferably tubular with a circular cross section. It would also be possible to produce a U-shaped profile UP1 and the tab or the closure OP1 onsite using the extruder. A filling needle for supplying the filling compound FC1 can, accordingly, also be provided in a known manner in the interior of the extruder head. For the power supply of such an extruder device, the motor MO and a generator connected to this motor (not shown) can be used. The generator will provide the necessary electrical power for heating of the extruder. It is also possible, for example, to extrude a rectangular profile, which is accompanied by advantages when using ribbons of a high packing density. This is possible since the cable no longer needs to be wound up on a drum. Sufficient cooling can be obtained in a simple way, for example, by a corresponding distance being provided from the point of laying into the cable trench and the extruder. Any other duct or pipe and/or support rollers, which effect additional cooling down, may be provided in the region following the extruder to aid in cooling. The application of any lubricant can also take place in this region.

If required, an appropriately configured, as flexible as possible, guide tube can be provided on the vehicle VC1, and this tube will permit the cable to be guided from the vehicle to the actual trench or to the duct in an appropriately predefined, for example curved, path. In the case of drawing into ducts or pipelines, it may be expedient to provide at least one additional auxiliary drive in one or more remote ducts, and this drive will engage on a tensioner and/or tension wire.

The protective sheath can be designed to be conductive or dielectric, for example even in the form of an almost closed steel pipe, so that no shaping device is necessary. If metallic sheathings are used as the cable cover, the process may also begin from a metal band which is shaped by a corresponding shaping device to make a C-shaped tube, which is then closed by suitable measures, for example by welding.

The take-off measurement can be carried out on site, in particular, at one time, and advantageously in the built-in state. The motor MO of the drive device VC1 can be used for the energy supply of the production means. For this purpose, a generator is used for the electrical generation of heat. The exhaust gas heat from the motor can also be used at the same time. The motor can be used for the direct drive, for example, of the extruder, of the draw-off devices and of the generator, etc. Independently or in addition thereto, a separate unit for power supply may also be provided.

The use of the invention is also possible in the case of fitting the cable to or in an electrical high-voltage overhead line. The cable is produced directly under the overhead line and is pulled upward and lashed thereon. For this purpose, the vehicle travels along under the route. During the laying, a helicopter can lay the cable above while it is being produced below on the mobile device.

Although various minor modifications may be suggested by those versed in the art, it should be understood that we wish to embody within the scope of the patent granted hereon all such modifications as reasonably and properly come within the scope of our contribution to the art.

We claim:

1. A method for producing a cable having at least one outer protective, sealed sheath and at least one conductor selected from electrical leads and optical fibers arranged in the interior of the sheath, said method comprising providing a mobile device having a first supply spool for the conductor, a second supply spool having material for a first part of the sheath and a third supply spool having material for a second part of the sheath; drawing off the material from the second supply spool and forming the first part; drawing off the conductor from the first spool and placing the drawn off conductor into the formed first part; drawing off material from the third supply spool and forming a second part; sealing the second part to the first part to form the cable with the conductor in the protective, sealed sheath and then placing the cable in the laying position adjacent the mobile device.

2. A method according to claim 1, wherein the step of forming the first part provides a part with a U-shaped transverse cross-section with two legs connected by a bight portion.

3. A method according to claim 1, wherein the step of forming the second part provides a strip-shaped part.

4. A method according to claim 3, wherein the step of sealing connects the second part between the end of the legs of the first part by a step selected from gluing, welding and mechanically connecting.

5. A method according to claim 3, wherein the step of forming the first part provides a groove adjacent the end of each leg facing the groove of the other leg and the step of sealing includes engaging the edges of the strip-shaped part in the facing grooves.

6. A method according to claim 1, which includes applying a reinforcement on an outer surface of the sheath before placing the cable in the laying position.

7. A method according to claim 1, which includes introducing a filling compound into the first part to surround the conductor.

8. A method according to claim 7, wherein the step of introducing a filling compound provides a filling compound selected from a group consisting of oil, thixotropic agent, thickening agent, a mixture of oil and thickening agent and a mixture of oil and a thixotropic agent.

9. A method according to claim 1, wherein the step of sealing includes pressing the second part onto the first part with a roller.

10. A method according to claim 1, wherein the conducting element is surrounded by a tubular member so that the cable comprises a tubular member surrounded by the protective, sealed sheath.

* * * * *